Patented Apr. 8, 1952

2,591,945

UNITED STATES PATENT OFFICE 2,591,945

PROCESS FOR THE RECOVERY OF PROTEIN FROM WOOL AND OTHER KERATINOUS MATERIALS

Ernst C. Koerner, Woodridge, Hugo Ehrhardt, Nutley, Frederick R. Haigh, Passaic, and John Kirchhof, Clifton, N. J., assignors to Botany Mills, Inc., Passaic, N. J., a corporation of New Jersey No Drawing. Application November 12, 1948, Serial No. 59,754

4 Claims. (Cl. 260—123.7)

The present invention relates to the recovery of proteins from keratinous material, particularly wool. It is specifically directed towards the economic recovery of higher yields of protein than heretofore obtained by known methods, enabling large scale production of pure protein.

It is a further object of this invention, to provide a process for the recovery of the specific proteins of high cystine content present in keratinous matter such as wool, it being pointed out here that the only protein with a similar cystine content is the protein insulin.

It is a further object of this invention to provide for the recovery in commercial quantities of an edible and digestible, pharmaceutical protein.

In carrying out this invention wool and wool waste have been employed as starting material. For instance, waste wool which results from the napping or shearing operations in the process of manufacturing wool cloth may be used.

The essential principles underlying the process set forth is to treat the keratinous matter, for example, wool waste, in such manner as to break the disulfide bond R—S—S—R, to form, instead of the disulfide linkages, sulfhydryl groups.

The empirical steps are schematically set forth here:

(1)   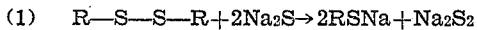

The applicants herein have observed that by a specific adjustment of pH the reaction will proceed as follows:

(2)   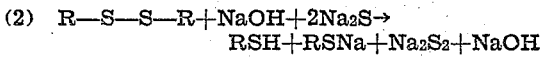

The next problem which presents itself is that a sulfur-contaminated protein results as the end yield of this process. The most troublesome impurity in the protein synthesis is free sulfur. The free sulfur will contaminate the thus obtained protein, eliminating its use for pharmaceutical or feed purposes.

It is therefore necessary to remove all free sulfur formed in the reaction immediately and concurrently with the breaking of the disulfide linkage, so as to prevent a possible contamination of the protein by the free sulfur released by the rupturing of the disulfide bond.

It is known that sulfites readily and rapidly absorb available free sulfur from polysulfides:

(3)   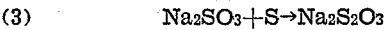

In carrying out the invention, therefore, it was a matter of expediency to adapt the known process steps to large scale production and to integrate the said procedure into a commercially operative manufacturing process.

While it was known in the art that protein could be recovered from keratinous matter by means of a reduction, i. e., the breaking of the disulfide linkage, it was not heretofore possible to obtain commercial yields of a chemically pure protein by means of employing the various known reduction agents.

While it is known in the art that a sulfite in the presence of a polysulfide will form a thiosulfate, thus absorbing the available free sulfur, it has not been heretofore attempted to employ a sulfide in combination with the sulfite in order to reduce the disulfide linkage and at the same time to absorb the thus freed sulfur, by means of the sulfite, in this manner permitting the recovery of a substantially pure protein which is not contaminated by sulfur.

Wool protein, the protein recovered from wool and wool waste, if uncontaminated by sulfur, is of particular interest because of its high cystine content, a cystine content such as is otherwise found only in insulin.

A further problem encountered in the use of wool and wool waste as a starting material for the synthesis of proteins therefrom, arises from the difficulty of bringing the wool into a condition of dispersion, so that the reducing agents may readily attack the empirical wool structure. In order to bring the wool into a dispersion so as to be adaptable to the reducing step, the wool has to be prepared.

The combination of the steps, the pre-treatment, the reduction, the specific proportion of chemicals employed and the time and temperature factors in critical ranges in combination, control the yield of protein. By a careful control of the pre-treatment and the reduction, the chemicals employed in both operations, and the time and temperature factors in critical ranges, it has been determined that yields of protein up to 99 percent are recoverable, which leads to the conclusion that all recoverable proteins have been recovered by means of the set forth process under carefully controlled conditions.

By means of the careful control of the entire process, all its steps, the chemicals employed, the time and temperature factors, it is possible to obtain a sulfur-free protein, substantially chemically pure. Thus it has been found that here exists a combination of operational steps which permits a particularly economical method of recovery of protein from cheap, available raw material sources.

The exact control of time and temperature in critical ranges as well as exact amounts of chemicals employed in both the pre-treatment and subsequent reduction, are highly determinative of the final yield.

The correlation between the pre-treatment step and the reducing operation as determining the final yield of protein obtained by means of this process, will be evident by a study of Table 1, wherein it is clearly shown how a slight variation in the Normality-factor of the acid employed in the pre-treatment operation may cause an extreme alteration in the quantity of yield of protein.

Table

| N/HCl | Time | Temperature | Reduc. Agents | Protein Yield |
|---|---|---|---|---|
| | Days | | | Percent |
| 1 | 3 | Ambient | Const | 64 |
| 4 | 3 | do | Const | 92 |
| 4.25 | 3 | do | Const | 99 |
| 5 | 3 | do | Const | 88 |
| 7 | 3 | do | Const | 66 |

It is obvious on hand of a study of the table to see how important is an exact control of all the factors such as time, temperature, Normality, mol-equivalent of reagent employed, in order to obtain a satisfactory yield.

The table clearly shows that the slightest variation in the Normality of the acid (during the acid pre-treatment step in which the wool fibre cuticle is softened in order to permit an adequate penetration during the subsequent reducing operation) may cause an extreme change in the final yield of protein.

By way of exemplification, however, not limiting the scope of the invention set forth herein, the entire process is now illustrated.

Waste wool, preferably first de-greased and cleaned by means of carbon tetrachloride or by means of scouring with a suitable detergent, is employed; it being pointed out here, that such preliminary cleaning of the wool is not an absolute necessity, and that raw wool may be employed which has not been degreased or cleaned.

The so-cleaned wool material is then subjected to a hydrochloric acid bath in order to cause a softening of the cuticle of the wool fibre. The acid pre-treatment also does substantially condition the wool fibre to the reduction operation which is to follow. In order to obtain the most satisfactory results, the acid pre-treatment must be carefully controlled. Preferably the wool is subjected to 4 to 5 Normal hydrochloric acid, the optimum being 4.25 N/HCl (employed in ratios ranging from 9/1 to 20/1; i. e., from 9 to 20 parts solution, to 1 part wool). The optimum condition has been found to be a 10/1 ratio, the acid solution of the indicated Normality being 10 times the weight of the wool involved in the reaction, for a period from 24 to 72 hours, at ambient temperatures.

The wool having been acid pre-treated and the cuticle of the wool fibre having been softened, in order to have a fibre adaptable to be subjected to further chemical treatment, namely, the reduction, in which the disulfide linkage is broken, the wool is then washed and neutralized. Sodium bicarbonate is preferably used for neutralizing the acid-treated fibres. This neutralization of the fibre and the washing operation is of the utmost importance in view of the fact that the reducing agents employed are alkaline and they would therefore form a salt with any remaining acid retained by the fibre.

The acid pre-treated wool, having been adequately neutralized and washed, so as to remove all traces of acid, is now subjected to the reduction, in which the disulfide bond is split.

The fibrous portion of the wool having been swelled by the pre-treatment in the acid bath, the wool is now in condition to absorb a maximum quantity of the reducing agents.

In order to achieve the most adequate reducton, and a complete breaking of the disulfide bond, resulting in the formation of sulfhydryl groups, the wool is subjected to a mixture of sulfide and sulfite salts in an alkaline aqueous solution of carefully adjusted pH.

The reducing agent, the sulfide salt, effects the rupture of the disulfide linkage while the co-acting sulfite salt is adapted to immediately take up the sulfur freed from the polysulfide formed by the rupture of the disulfide linkage. This reaction is set forth in its empirical steps (1), (2) and (3):

(1) 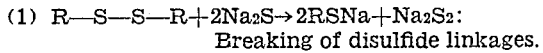
Breaking of disulfide linkages.

(2) 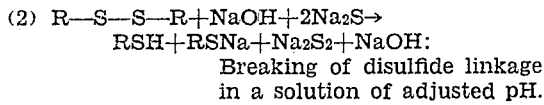
Breaking of disulfide linkage in a solution of adjusted pH.

(3) 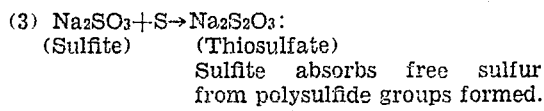
(Sulfite)    (Thiosulfate)
Sulfite absorbs free sulfur from polysulfide groups formed.

The immediate absorption of the sulfur freed during the reduction by the sulfite prevents the formation of sulfur-contaminated protein. The protein obviously is the natural result of the breaking of the disulfide linkage in the keratinous material by means of the reducing agent.

The thus completed acid pre-treatment and reduction operations are now followed by a precipitation in which the protein obtained during the reduction is recovered from the dispersion. It is preferable to precipitate the protein by inducing a rapid change in pH in the dispersion solution. The dispersion solution has a pH of 9.2. Acid is slowly introduced into the dispersion until the pH has been changed towards the acid side (below 5.6 pH), thus causing the protein to precipitate out of the dispersion.

Customary washing and cleaning operations, in order to remove any remnants of thiosulfate in the protein, may follow the reduction operation, and in this manner a commercial grade of protein of desired purity is obtained.

As shown in the table, the exact control of the acid pre-treatment step governed the final yield of protein. In the same manner it is necessary to control the reduction operation in order to obtain maximum yield.

It has been observed by the applicants herein that when sodium sulfite is employed in conjunction with sodium sulfide, not only does the sodium sulfide act in the predictable manner by absorbing the free sulfur formed during the reduction operation, but also that the sodium sulfite when in combination with the sodium sulfide, the two conjoint compounds will exert a synergistic effect.

The synergistic effect of the mixture is best demonstrated at low sodium sulfide concentrations. Here 6.5% of sodium sulfide disperses 90% of the wool, when in combination with sodium sulfite, whereas 6.5% sodium sulfide without the sodium sulfite will only disperse 65% of the wool. Actually 6.5% sodium sulfide plus sodium sulfite are in combination capable of dispersing all the wool, not only 90%, when the pH of the dispersion solution is properly adjusted.

The reason for the synergistic behavior of sodium sulfide when combined with sodium sulfite, in that the combined salts will dissolve 25 to 30% more of the wool than each of them if used separately would dissolve, is of great interest.

Thus the sodium sulfite does not only eliminate the free sulfur formed in the reduction of the disulfide linkage by the sodium sulfide, but it also jointly with the sodium sulfide will effect a high degree of dispersion such as could not be obtained by employing sodium sulfide alone.

As pointed out heretofore, the reduction process must be carefully controlled.

Sodium sulfide ($Na_2S$) is preferably employed in amounts of from 5 to 7% by weight to the wool. (Five to seven parts of sodium sulfide parts by weight, to 100 parts of wool by weight.) The optimum amount, i. e., the most satisfactory quantity sodium sulfide, has been determined at 6.3% of sodium sulfide calculated as above.

12 to 18% of sodium sulfite ($Na_2SO_3$) is employed in the reduction baths, depending on the amount of available free sulfur. The optimum quantity of sodium sulfite has been found to be 14 parts of sodium sufite to 100 parts of wool by weight.

The pH of this solution containing the sodium sulfide and sodium sulfite is about pH 8. The optimum pH for the maximum recovery of protein has been determined to be at 9.2, therefore sodium hydroxide (NaOH) is added to the solution until the pH has been adjusted. Variations of pH from pH 9 to pH 9.5 are permissible without a great loss of yield.

The thus obtained mixture of wool and the aqueous solution of chemicals is subjected to agitation in a closed container, under the exclusion of air, for a period of from 1 to 2 hours, until the dispersion is complete. The temperature of the mixture should be maintained at temperatures ranging from 120 to 150° F. The temperature should not be too high, in order to avoid the taking place of hydrolysis within the dispersion mixture. The most satisfactory temperature has been determined as 140° F.

Thus it is evident that an exact control of the reduction procedure is of the utmost importance.

By way of exemplification, however, not limiting the scope of the process set forth herein, the following example is given.

100 parts of degreased wool were subjected to 4.25 N/HCl making an acid solution of 1000 parts to the 100 parts of wool, for a period of 72 hours at room temperature. The wool was thereafter recovered, repeatedly washed, dried and treated with sodium bicarbonate ($NaHCO_3$) in order to remove all traces of acid from the wool. This is necessary because alkaline salts are employed in the reducing process, which salts would react with any remnants of hydrochloric acid remaining in the fibres of the wool. The neutralized and washed wool is now subjected to the reduction treatment in which the disulfide linkage is split to form sulfhydryl groups. In the reduction operation sodium sulfide is employed together with sodium sulfite. This serves two purposes. The sodium sulfite is a customary reducing agent; however, it will dissolve only 65% of the total wool. If the sodium sulfite is employed together with sodium sulfide, the mixture will dissolve from 90 to 100% of the total wool.

The sodium sulfate will furthermore act to immediately accept sulfur freed in the reduction of the disulfide linkage forming a thiosulfate. Thus the contamination of the protein recovered by means of rupturing the disulfide linkage is avoided, and a substantially pure uncontaminated protein can be recovered.

6.3 parts of sodium sulfide ($Na_2S$) are employed to each 100 parts of wool.

14 parts of sodium sulfite ($Na_2SO_3$) are used to each 100 parts of wool and introduced into the mixture.

The pH of this solution is now pH 8. The pH desirable in order to obtain the best and most complete dispersion of the wool and the most complete breaking of the disulfide linkage, has been found to reside at 9.2 pH.

The pH of the pH 8 solution is therefore adjusted by the addition of 1.1 parts of sodium hydroxide (NaOH) to reach pH 9.2.

The mixture of wool, sodium sulfide and sodium sulfite in the alkaline solution of adjusted pH of 9.2 is agitated for 120 minutes at 140° F. in a closed vessel substantially under the exclusion of air. After the wool is completely dispersed, the agitation is stopped and acetic acid is slowly introduced into the dispersion (HAc 40% by weight) until the pH of the solution has been reversed to the acid side to give a pH reading of below 5.6. In this manner the protein recovered by means of splitting the disulfide linkage is precipitated and flocculated.

The precipitated protein is filtered and washed repeatedly until a test with silver ($AgNO_3$) is negative, indicating that no further free available thiosulfate is adhering to the flocculated, precipitated protein.

The pure protein, amounting to 95% of the total of the wool, substantially all the protein contained in the wool starting material, is now dried and desiccated.

The thus recovered protein can be used for the synthesis of amino acids and protein hydrolysates, allowing the synthesis of Glysine, Alanine, Valine, Leucine, Serine, Proline, Aspargic Acid, Glutamic Acid, Cystine, Tyrosine, Tryptophane, Arginine, Histidine, Lysine, Threonine, Methionine and Phenylalanine.

The protein recovered by means of this process is adaptable to be employed as a pharmaceutical, a food ingredient, an inhibiting agent for corrosion, a fixative for dyestuffs, lacquers and pigments in calico or indigo printing, and as an emulsifying agent or a buffer.

Thus by means of the process developed by the applicants herein it has been possible to synthesize on a commercially operative scale, substantially pure, uncontaminated protein, permitting the recovery of almost 100% of the total protein content of wool. The present process permits an economical recovery of a protein of high cystine content from wool, wool waste and the like. By adapting the process steps to each other, carefully controlling all factors, a synergistic effect has been observed in that it is possible, by means of the combination of two salts, a sulfide and a sulfite, to get all the wool employed as a starting material into solution.

By means of this careful control it has been furthermore possible to prevent a contamination of the protein, said contamination resulting from the employment of all conventional procedures. The applicants herein have provided a process wherein by synergistic effect between two salts a maximum quantity of the wool can be converted into protein. The applicants herein have set forth a process which permits the immediate recovery of pure protein in uncontaminated form, wherein by careful control of the reduction operation the free sulfur is immediately removed from the recovered protein; thus the protein cannot be contaminated by sulfur. The applicants have developed a pre-treatment operation permitting a substantial softening of the cuticle of the wool fibres, causing a swelling of said fibres, adapting said fibres to the subsequent reduction process in such manner that all the available wool matter can be effectively reduced in the reduction step following the pretreatment set forth.

Having described our invention, what we claim and desire to secure by Letters Patent, is as follows:

1. A process for recovery of substantially all protein contained in keratinous material exemplified by wool in a form free from elemental sulfur comprising treating said keratinous material in an acid bath of controlled pH for at least 24 hours thereby pre-conditioning said keratinous material for subsequent chemical reaction, and subjecting said pre-conditioned keratinous material to a reduction consisting of a controlled amount of alkali metal sulfide and a larger controlled amount of alkali metal sulfite to effect a rupture of the disulfide bond in said keratinous material with simultaneous elimination of any free sulfur evolved by reaction in situ with the sulfite molecules present to yield thiosulfate molecules, and thereafter acidifying the reduced keratinous matter to produce a protein free of elemental sulfur.

2. A process for the recovery of protein contained in keratinous material exemplified by wool waste, comprising the steps of softening the keratinous material by an acid bath, neutralizing said acid-treated keratinous material and subjecting said acid-treated keratinous material to a bath of adjusted pH at about 9 to 9.5, said bath consisting of from 12 to 18 parts of sodium sulfite ($Na_2SO_3$) calculated to 100 parts of wool, and from 5 to 7 parts of sodium sulfide ($Na_2S$) calculated to 100 parts of wool, maintaining said keratinous material in said reducing bath for a period of from 1 to 2 hours at a temperature from 120 to 150° F., and acidifying the thus treated material thereby precipitating the protein.

3. A process for the recovery of substantially all protein contained in keratinous material exemplified by wool waste comprising subjecting the said keratinous material to a hydrochloric acid bath having a normality of from 4N to 5N for a period of from 24 to 72 hours at ambient temperatures, said bath being adapted to soften the cuticle of the wool fibres and precondition said wool fibres for the subsequent reduction by an alkaline bath, neutralizing said acid-treated keratinous material, subjecting said acid treated and neutralized keratinous material to a reduction bath of adjusted pH of about 9 to about 9.5, said reduction bath consisting of from about 12 to about 18 per cent sodium sulfite and from about 5 to about 7 per cent sodium sulfide, maintaining said keratinous material in said reducing bath for a period of 1 to 2 hours at a temperature from 120° to 150° F. under agitation and substantial exclusion of air, acidifying said dispersion under agitation until the pH of the said dispersion is below pH 5.6, and recovering the precipitated protein.

4. The process of claim 3 wherein the reduction step breaks the disulfide linkage structure of said wool fibers, pre-treated by said hydrochloric acid treatment, whereby an ultimate protein product free of contamination by elemental sulfur is obtained.

ERNST C. KOERNER.
HUGO EHRHARDT.
FREDERICK R. HAIGH.
JOHN KIRCHHOF.

REFERENCES CITED

The following references are of record in the file of this patent:

UNITED STATES PATENTS

| Number | Name | Date |
|---|---|---|
| 2,351,718 | Speakman | June 20, 1944 |
| 2,370,669 | Joseph | Mar. 6, 1945 |
| 2,413,983 | Lustig et al. | Jan. 7, 1947 |

FOREIGN PATENTS

| Number | Country | Date |
|---|---|---|
| 453,559 | Great Britain | Sept. 3, 1936 |

OTHER REFERENCES

Smith et al.: Proc. Amer. Assn. Textile Chem. and Col., July 11, 1938, pp. 387, 388.